United States Patent
Shimamori (10) Patent No.: US 8,147,997 B2
(45) Date of Patent: *Apr. 3, 2012

(54) FILM-COVERED ELECTRICAL DEVICE PACKAGING SYSTEM

(75) Inventor: Tadashi Shimamori, Sagamihara (JP)

(73) Assignees: NEC Corporation, Tokyo (JP); Fuji Jukogyo Kabushiki Kaisha, Tokyo (JP)

( * ) Notice: Subject to any disclaimer, the term of this patent is extended or adjusted under 35 U.S.C. 154(b) by 669 days.

This patent is subject to a terminal disclaimer.

(21) Appl. No.: 12/090,217

(22) PCT Filed: Oct. 10, 2006

(86) PCT No.: PCT/JP2006/320173
§ 371 (c)(1),
(2), (4) Date: Apr. 14, 2008

(87) PCT Pub. No.: WO2007/043510
PCT Pub. Date: Apr. 19, 2007

(65) Prior Publication Data
US 2009/0286138 A1 Nov. 19, 2009

(30) Foreign Application Priority Data
Oct. 14, 2005 (JP) .................................. 2005-300221

(51) Int. Cl.
*H01M 2/10* (2006.01)
(52) U.S. Cl. ........... 429/53; 429/152; 429/153; 429/163
(58) Field of Classification Search .............. 429/53–56, 429/82–89, 96, 99–100, 156–158, 162–187
See application file for complete search history.

(56) References Cited

U.S. PATENT DOCUMENTS

| | | | |
|---|---|---|---|
| 4,468,440 A * | 8/1984 | Evjen | 429/8 |
| 6,558,438 B1 * | 5/2003 | Satoh et al. | 29/623.1 |
| 7,597,992 B2 * | 10/2009 | Kanai et al. | 429/53 |
| 2002/0098412 A1 | 7/2002 | Rodriguez et al. | |
| 2005/0069759 A1 * | 3/2005 | Shimamura et al. | 429/53 |
| 2005/0170239 A1 | 8/2005 | Uemoto et al. | |
| 2005/0208375 A1 * | 9/2005 | Sakurai | 429/162 |

(Continued)

FOREIGN PATENT DOCUMENTS
JP 10-012278 A 1/1998
(Continued)

OTHER PUBLICATIONS

Japanese Office Action issued Aug. 16, 2011, corresponding to Japanese Patent Application No. 2007-539938.

*Primary Examiner* — Basia Ridley
*Assistant Examiner* — Jacob Buchanan
(74) *Attorney, Agent, or Firm* — Sughrue Mion, PLLC (57) ABSTRACT

A film-covered electrical device packaging system of the present invention includes frame member (10) which holds film covered battery (1) by an outer periphery portion of film covered battery (1) and which has a portion thicker than the thickness of power generation element (2), and in which waste gas channel (10*i*) is formed in a position corresponding to gas discharger (8), and first pressure plate (20) which sandwiches frame member (10), in which penetrating portion (22) is formed in a position corresponding to waste gas channel (10*i*), and in which gas guide groove (21) communicating from through holes (22) to sidewall face (24) is formed.

6 Claims, 5 Drawing Sheets

U.S. PATENT DOCUMENTS

| | | | |
|---|---|---|---|
| 2005/0221177 A1* | 10/2005 | Amagai et al. | 429/186 |
| 2005/0231158 A1* | 10/2005 | Higashino | 320/112 |
| 2006/0051658 A1* | 3/2006 | Otohata et al. | 429/53 |
| 2008/0187820 A1* | 8/2008 | Nakano et al. | 429/83 |

FOREIGN PATENT DOCUMENTS

| | | | |
|---|---|---|---|
| JP | 11-176400 A | | 7/1999 |
| JP | 2001-93497 A | | 6/2001 |
| JP | 2005-129487 A | | 6/2004 |
| JP | 2005-116235 A | | 4/2005 |
| WO | 00/59063 A1 | | 5/2000 |
| WO | WO-2004/010517 | * | 1/2004 |
| WO | 2005/096412 A1 | | 10/2005 |
| WO | WO 2006067979 A1 | * | 6/2006 |
| WO | WO 2006073071 A1 | * | 7/2006 |
| WO | 2007/043510 A1 | | 4/2007 |

* cited by examiner

FILM-COVERED ELECTRICAL DEVICE PACKAGING SYSTEM

TECHNICAL FIELD

The present invention relates to a film-covered electrical device packaging system which packages a film-covered electrical device.

BACKGROUND ART

Recently, the development of electric vehicles and hybrid electric vehicles (hereafter, this is called simply "an electric vehicle and the like") each carrying a battery for a motor drive has been advanced rapidly. In order to enhance steering characteristics and cruising range, naturally, light weight and a thin profile are requested also for a battery mounted in an electric vehicle and the like. In order to make a battery light and thin, a film covered battery has been developed using laminate material which is made into a film by superposing a metal layer, such as aluminum, and a thermal welding resin layer on the case body through an adhesive layer, and making them thin. Generally, the laminate material has a structure in which both surfaces of a thin metal layer, such as aluminum are coated, with a thin resin layer, and which is resistive to acid and alkali and which has lightweight and flexible property.

Generally, the characteristics of a battery are influenced by expansion and shrinkage of the active material of a positive electrode and a negative electrode at the time of discharge and charge. Thus, heretofore, deformation of a battery has been suppressed by using a metal case. Nevertheless, in the case of a film covered battery, it is hardly possible to suppress swelling of a battery that has a laminate film case. To suppress battery swelling, it is necessary to apply a proper load to the battery.

For this reason, in order to suppress the swelling of a battery, for example, an organic electrolyte secondary battery is disclosed (refer to Japanese Patent Laid-Open No. 10-012278). The organic electrolyte secondary battery has an electrode group in which a positive electrode and a negative electrode are stacked together with a separator. The stacked electrode group of the battery is packaged in a pressure member whose sectional shape is angular U-shaped. The angular U-shape has a plurality of protrusions respectively on the inside of both faces of U-shape and these faces are opposite to each other.

In addition, although a film covered battery is constructed by putting a electrical device element between laminate materials which face each other and by welding a peripheral portion of the laminate materials by thermal welding, a gas discharger is provided, in a part in a thermally fused portion of this film covered battery, through which peeling off is caused in a portion by pressure which is lower than in other portions.

When a voltage outside of a standard range is applied to a battery at the time of use of the battery, gas may be generated by electrolysis of an electrolyte solvent, and internal pressure of the battery may rise. Furthermore, even if a battery is used at high temperatures outside of a standard range, gas is generated by decomposition of electrolyte salt, and the like. Fundamentally, although it is ideal to use a battery within a standard range and to prevent the generation of gas when a control circuit of a battery malfunctions due to a certain cause and an unusual voltage is applied, or when the temperature becomes unusually high due to a certain cause, depending on the case, a lot of gas may be generated.

Such generation of a gas inside a battery causes the internal pressure of a battery to rise. Many batteries that use a metal can as a case to prevent accidental battery discharge resulting from extremely internal pressure have a pressure safety valve which allows gas to escape to the outside when the internal pressure of the battery rises. However, it is difficult structurally to provide a pressure safety valve in a film covered battery which uses a film as a case. Although film expands in a battery case that uses a film as a cover, the case member will eventually explode and gas will be vented from the location where excessive internal pressure has built up, and because it is not possible to specify where a rupture occur, the rupture may adversely affect the surrounding apparatus and the like depending on the location where the gas is vented.

Then, in a film covered battery, in order prevent a malfunction by such gas generation inside the battery, a gas discharge portion which is mentioned above is provided in a thermally fused portion.

DISCLOSURE OF THE INVENTION

In order to prevent generated gas from adversely affecting each portion of the battery, it is desirable that a film covered battery have a construction such that gas is vent from a predetermined location and that the gas that vents from this location moves along one gas discharge channel which guides the gas to the outside. Since gas discharged from a battery usually is discharged in an upward direction, a duct or a groove is formed in a pressure plate which holds down an assembled battery from the above when the gas is to be gathered into one location.

Nevertheless, when a duct is formed in a pressure plate, an overall height of a system will become high by the duct. In addition, a construction adopting a duct as a different part will cause an increase in the number of parts that are used.

On the other hand, when a groove is formed in a pressure plate, rigidity of the portion of the plate where the groove is formed decreases, and hence in such a case applying uniform pressure to a battery becomes impossible.

Then, the present invention aims to provide a film-covered electrical device packaging system which can apply uniform pressure to a battery, and in which an increase in the overall height of a system is prevented.

In order to achieve the above-described objects, a film-covered electrical device packaging system of the present invention is a film-covered electrical device packaging system for fixing a film-covered electrical device which has an electrical device element, a case film which is arranged so that it surrounds the electrical device element, and a gas discharger provided in the case film, being characterized by comprising a frame member which has a portion thicker than thickness of the electrical device element, which holds an outer periphery portion of each film-covered electrical device in the portion in question, and in which a waste gas channel is formed in a position corresponding to the gas discharger, and a pressure plate which holds down the frame member in its depth direction, in which a through hole is formed in a position corresponding to the waste gas channel, and in which a gas guide groove communicating from the through hole to a sidewall face is formed.

Since the pressure plate of the film-covered electrical device packaging system of the present invention as mentioned above holds down the frame member which has the portion thicker than the thickness of the electrical device element, a space is formed between the pressure plate and the electrical device element. For this reason, only atmospheric pressure is applied to the electrical device element, and in other words, only uniform pressure is applied. Therefore, even if the pressure plate is used in which the rigidity distribution of the plate is not uniform because of the gas guide groove being formed, it is possible to prevent uneven pressure from being applied to the electrical device element.

In addition, since the channel for guiding gas from the through hole to the sidewall face is groove-shaped, in comparison with a duct form extending to the outside, it is possible to lower the overall height of a system. Furthermore, since the channel for guiding a gas to the outside is a groove, it is not necessary to form a channel by using a different part such as a duct, and hence, the number of parts can be reduced.

Furthermore, the film-covered electrical device packaging system of the present invention may have a plurality of independent gas guide grooves, or may have one gas guide groove which has a plurality of through holes.

Moreover, the film-covered electrical device packaging system of the present invention may have a frame member that packages a film-covered electrical device, and a case that packages a pressure plate which holds down the frame member.

In addition, the film-covered electrical device packaging system of the present invention may be an object in which a pressure plate has a first fixing portion, and a second fixing portion whose thickness is thinner than that of the first fixing portion, and in which the pressure plate is fixed in a case because the first fixing portion abuts on a wall surface in the case.

Furthermore, the film-covered electrical device packaging system of the present invention may be an object in which a case has an opening portion which introduces cooling air, a check valve is provided in the opening portion, and an exhaust port which discharges the cooling air and is formed in a position which faces the opening portion. In this case, the cooling air flows smoothly into an exhaust port side from an inlet side.

As mentioned above, the pressure plates of the present invention sandwiches the frame member which has a portion thicker than the thickness of the electrical device element. For this reason, a space is formed between the electrical device element and the pressure plate, and, therefore, uniform atmospheric pressure is applied to the electrical device element. Thus, according to the present invention, even if a gas guide groove is formed in the pressure plate, it is possible to prevent uneven pressure from being applied. In addition, since the channel for guiding gas from the through hole to the sidewall face is groove-shaped, in comparison with a duct form extending to the outside, it is possible to lower the overall height of a system. Furthermore, since the channel for guiding a gas to the outside is made into a groove, it is not necessary to form a channel by using a different part such as a duct, and hence, the number of parts can be reduced.

BEST MODE FOR CARRYING OUT THE INVENTION

Figure 1:
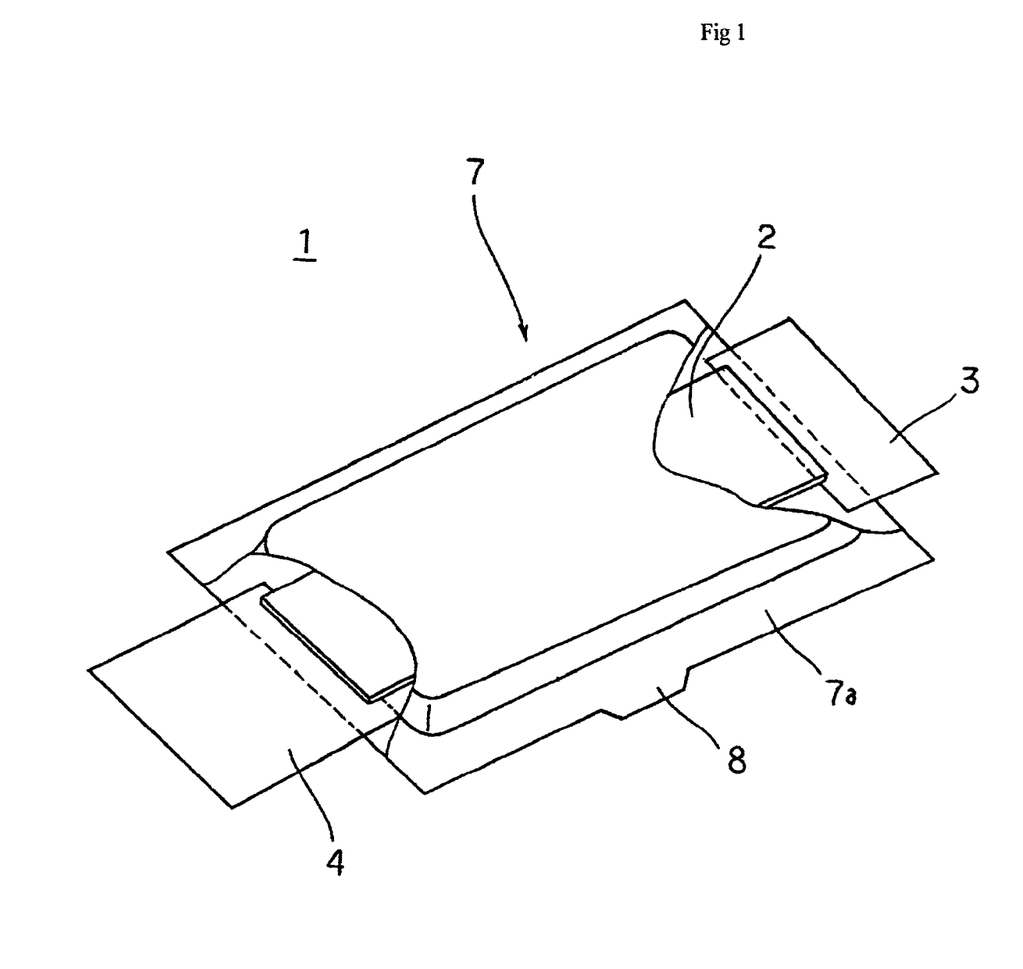
FIG. 1 is a schematic external perspective view of a laminated battery of the present invention.

An external perspective view of the film covered battery of this exemplary embodiment is illustrated in FIG. 1.

Film-covered battery 1 of this exemplary embodiment has battery element 2 which has a positive active electrode, a negative active electrode, and an electrolyte, laminated film 7 which is formed by arranging a metallic film, such as aluminum, and a heat-sealing resin film, in stack. Film-covered battery 1 has structure made of sealing battery element 2 that has two sheets of laminated film 7. That is, film-covered battery 1 of this exemplary embodiment is made into a bag by heat-sealing the first three sides among thermally fused portions 7a which are four sides of laminated film 7. Then, evacuation is performed by internal air being evacuated from one remaining open side. After that, battery element 2 is hermetically sealed with two sheets of laminated film 7 heat-sealing by one remaining side of thermally fused portions 7a. In addition, it is also sufficient to form a bag by bending one sheet of laminated film and heat-sealing the three remaining sides.

Battery element 2 of film-covered battery 1 may be a stacking type which is constructed of a positive active electrode and a negative active electrode having a separator disposed between the electrodes that make up the stack. Alternatively, battery element 2 may have a wound structure in which the positive and negative active electrodes are wound in a coil to provide alternating the positive and negative active electrodes by being compressed into a flat shape after separator has been disposed between the positive and negative active electrodes.

In addition, for use as battery element 2, an arbitrary battery element that is used for an normal battery is suitable as long as it includes a positive electrode, a negative electrode and electrolyte. A power generation element in a general rechargeable lithium-ion battery is formed by positioning a positive electrode plate made by coating positive electrode active material, such as lithium manganese multiple oxide and cobalt acid lithium, on both sides of an aluminum foil or the like and by positioning a negative electrode plate made by coating carbon material, which can dope and dedope lithium, on both sides of a copper foil or the like through a separator, and impregnating them with an electrolyte which contains lithium salt. As battery element 2, besides these, other types of power generation elements for chemical cells, such as a nickel-hydrogen battery, a nickel-cadmium battery, a lithium metal primary battery or a lithium metal secondary battery, and a lithium-polymer battery, can be cited. In addition, the present invention is applicable also to an electrical device where an electrical device element, which is like a capacitor element exemplified by a capacitor, such as an electric double layer capacitor, an electrolytic capacitor, or the like, and which stores electrical energy inside, and in which a gas may arise by a chemical reaction or by a physical reaction, is sealed with a case film.

From thermally fused portion 7a in a lateral direction of film-covered battery 1, positive electrode terminal 3 that is electrically connected to the positive active electrode and negative active electrode terminal 4 that is electrically connected to the negative active electrode extend and facing each other. Aluminum is used as positive electrode terminal 3, and copper or nickel is used as negative electrode terminal 4 because of their electrical characteristics. Hereafter, positive electrode terminal 3 and negative electrode terminal 4 may just be called electrodes.

In thermally fused portion 7a in a longitudinal direction of film-covered battery 1, the strength of one heat sealed portion of gas discharger 8 is made weaker than the strength of other portions so that the melted film can be peeled off by pressure that is lower in this portion than in other portions.

When a voltage that is outside of a standard range is applied to a battery when the battery is used, gas may be generated by electrolysis of the electrolyte solvent, and internal pressure of the battery may rise. Furthermore, even if a battery is used at high temperatures outside of the standard range, gas is generated by decomposition electrolyte salt, and the like. Fundamentally, it is best to use a battery within a standard range and to ensure that gas is not generated. Nevertheless, when a control circuit of a battery malfunctions for some reason and when an unusual voltage is applied, or when the temperature of the environment in which becomes unusually high for some reason, depending on the case, a large amount of gas may be generated.

Then, in film-covered battery 1, in order to prevent a malfunction that will be caused by this kind of gas generation inside the battery, gas discharger 8, mentioned above, is provided in thermally fused portion 7*a*, and the gas is discharged from the portion where gas discharger 8 is located.

Next, an assembled battery will be described using film-covered battery 1 that has the above-mentioned construction. In the case of this exemplary embodiment, as regards an assembled battery, a construction is adopted in which two batteries are arrayed in parallel, by using a frame member which assembles gathers these two batteries into one, and further, these frame members are stacked, and finally in which these frame members are held down by a pressure plate positioned in vertical direction.

Figure 2:
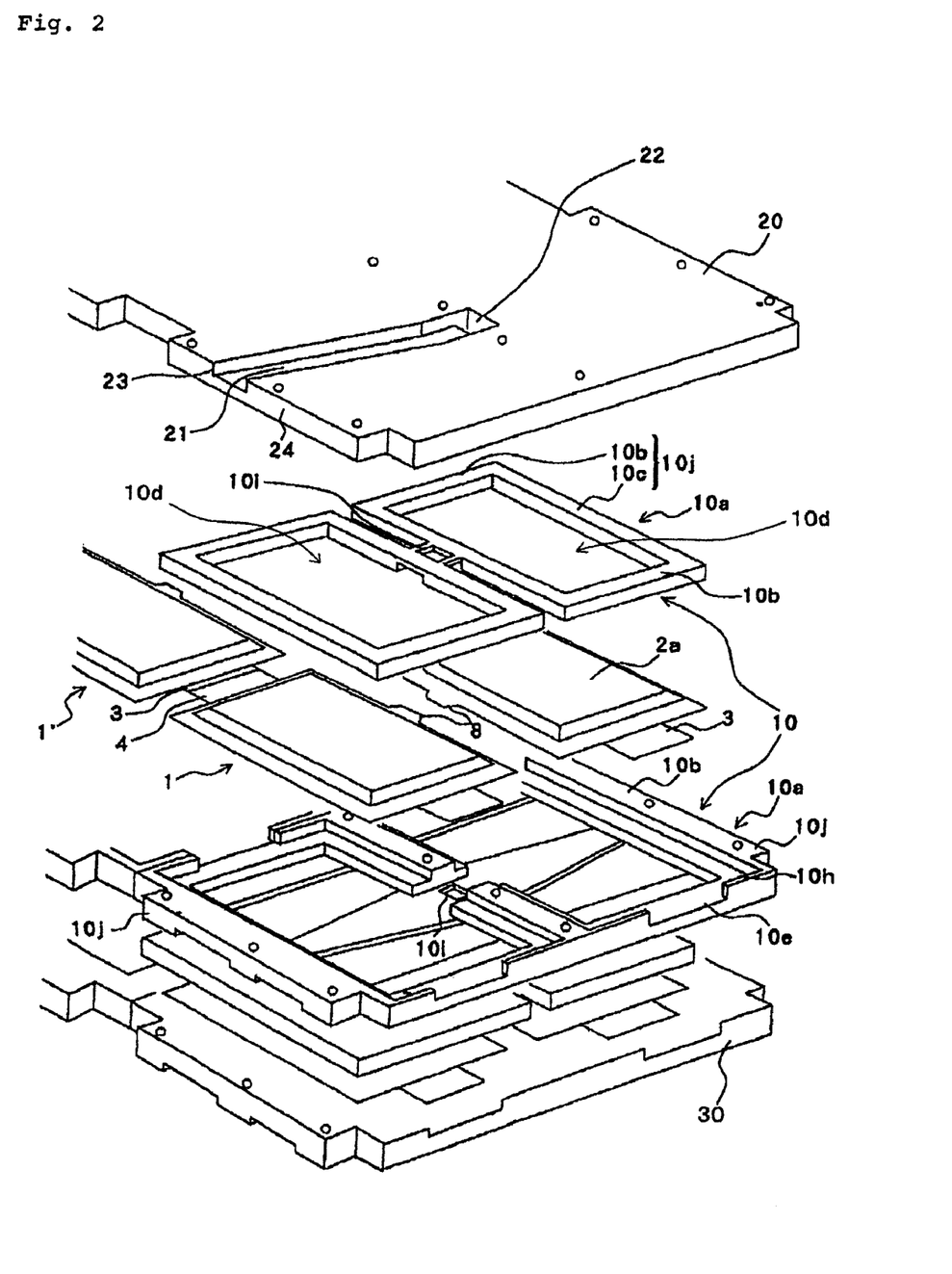
FIG. 2 is an exploded perspective view of an assembled battery of the present invention.

An exploded perspective view of the assembled batteries of this exemplary embodiment is illustrated in FIG. 2.

Frame member 10 is for fixedly holding batteries, which are made into an assembled battery, to a packaging case or the like with preventing strong pressure from being applied locally on principal surface 2*a* of battery element 2, that is, an electrode surface. In addition, so as to gather two batteries arranged in parallel into one, frame member 10 has a form that two frame bodies 10*j* corresponding to respective batteries are connected by waste gas channel 10*i*.

This frame member 10 can be divided in thickness direction of battery element 2, and it has two frame portions 10*a* bonded face to face.

Frame portion 10*a* has a frame form which is constructed of short side portions 10*b* corresponding to positive electrode terminal 3 and negative electrode terminal 4, and long side portions 10*c* corresponding to a longitudinal direction of battery element 2, and has construction in which battery element 2 can be arrange in space portion 10*d* surrounded by four sides of short side portions 10*b* and long side portions 10*c*. In addition, this frame portion 10*a* has lightening structure for weight saving. Thickness of frame portion 10*a* which is constructed of short side portions 10*b* and long side portions 10*c* is thicker than thickness of battery element 2. Therefore, when film-covered battery 1 is fixedly held and stacked in frame member 10, frame portions 10*a* of frame member 10 abut mutually, and a space is formed between stacked battery elements 2. Thus, a state that atmospheric pressure which is constant pressure is applied to principal surface 2*a* of battery element 2 occurs.

In short side portions 10*b*, nipping portions 10*e* for supporting battery element 2 are formed by making positive electrode terminal 3 and negative electrode terminal 4 extend to use outside, and nipping portions 10*e* sandwich positive electrode terminal 3 and negative electrode terminal 4.

When frame portions 10*a* are bonded face to face, the ridge portions of edge portions 10*h* of frame portions 10*a* abut mutually. Nipping portions 10*e* form a gap which becomes slightly narrower than the thickness of positive electrode terminal 3 and negative electrode terminal 4 in this state. For this reason, positive electrode terminal 3 and negative electrode terminal 4 which are inserted into this gap are sandwiched and fixed by nipping portions 10*e*.

In addition, frame portion 10*a*, in which nipping portions 10*e* are formed in inside and outside edge portions 10*h* of short side portions 10*b*, is illustrated in FIG. 2. However, the present invention is not limited to this, but, for example, nipping portion 10*e* may be formed inside or outside edge portions 10*h*. Alternatively, construction may be adopted in which inside and outside edge portions 10*h* are mutually connected, and nipping portions 10*e* of inside and outside edge portions 10*h* can support the electrodes in faces. Furthermore, lest positive electrode terminal 3 and negative electrode terminal 4 should move in the direction in which they were inserted, a step may be provided in positive electrode terminal 3 and negative electrode terminal 4, or a non-slip member, such as a rubber member, may be provided in nipping portion 10*e*.

When two batteries are stored in respective frame bodies 10*j*, respective gas dischargers 8 are made to face each other and to correspond to waste gas channel 10*i* of frame member 10.

Next, an outline of the production process of assembled batteries will be described.

First, alignment is performed so that battery element 2 may be arranged in space portion 10*d* of two opposite frame portions 10*a*. Subsequently, positive electrode terminal 3 and negative electrode terminal 4 which extend from battery element 2 are sandwiched by nipping portions 10*e* of two opposed frame portions 10*a* and fixed. In addition, there are cases in which fixation of frame portions 10*a* is sufficient to prevent may be performed in engaging an engaging pawl of one frame portion 10*a* and an engaging hole of the other frame portion 10*a*, which are not illustrated, and fixing them, or they may be fixed with an adhesive. Fixation of frame portions 10*a* may be performed in engaging an engaging pawl of one frame portion 10*a* and an engaging hole of the other frame portion 10*a*, which are not illustrated, and fixing them, or they may be fixed with an adhesive. In addition, there are cases in which fixation of frame portions 10*a* is sufficient just to prevent a positional offset, this is not illustrated, but, it is also good to adopt construction in which only alignment is made with a positioning protrusion of one frame portion 10*a*, and a positioning hole of the other frame portion 10*a*.

Since battery element 2 of film-covered battery 1 packaged in frame member 10 constructed as mentioned above is supported with positive electrode terminal 3 and negative electrode terminal 4 being sandwiched by nipping portions 10*e* of two frame portions 10*a*, no force for supporting battery element 2 is applied to principal surface 2*a* of battery element 2. That is, principal surface 2*a* of battery element 2 is in a state where uniform pressure is applied by atmospheric pressure.

In this way, film-covered battery 1 packaged in frame member 10 are sequentially stacked. In addition, FIG. 2 illustrates only one set of batteries in a stacking direction for simplification. That is, FIG. 2 illustrates only one battery in which a plurality of cells are stacked. In the assembled batteries of the present invention, batteries are arranged not only in a lamination direction but also in a horizontal direction (parallelly arranged direction). Another film-covered battery 1 connected to film-covered battery 1 is illustrated in FIG. 2.

As illustrated in FIG. 2, gas guide groove 21 is formed in first pressure plate 20. As regards one side of this gas guide groove 21, through hole 22 is formed in a position corresponding to waste gas channel 10*i* of frame member 10, and the other side is connected to exhaust port 23 formed in sidewall face 24.

Figure 3:
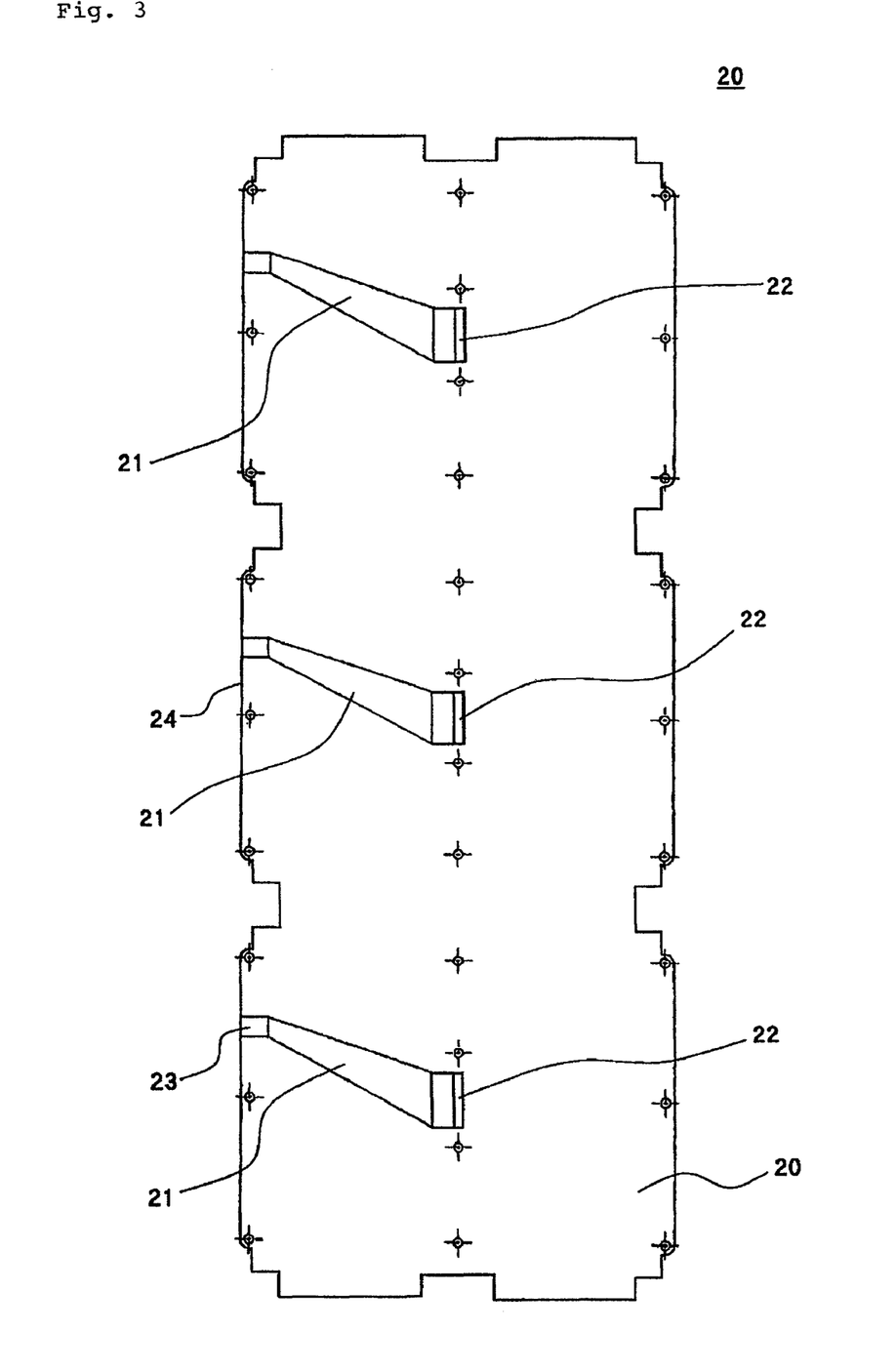
FIG. 3 is a top view illustrating an example of a first pressure plate of the present invention.

A top view of first pressure plate 20 is illustrated in FIG. 3. As regards first pressure plate 20 of this exemplary embodiment, three gas guide grooves 21 are formed. That is, first pressure plate 20 in FIG. 3 shows a construction example of unifying three sets of frame members 10 arranged in a horizontal direction with one sheet of first pressure plate 20.

Figure 4:
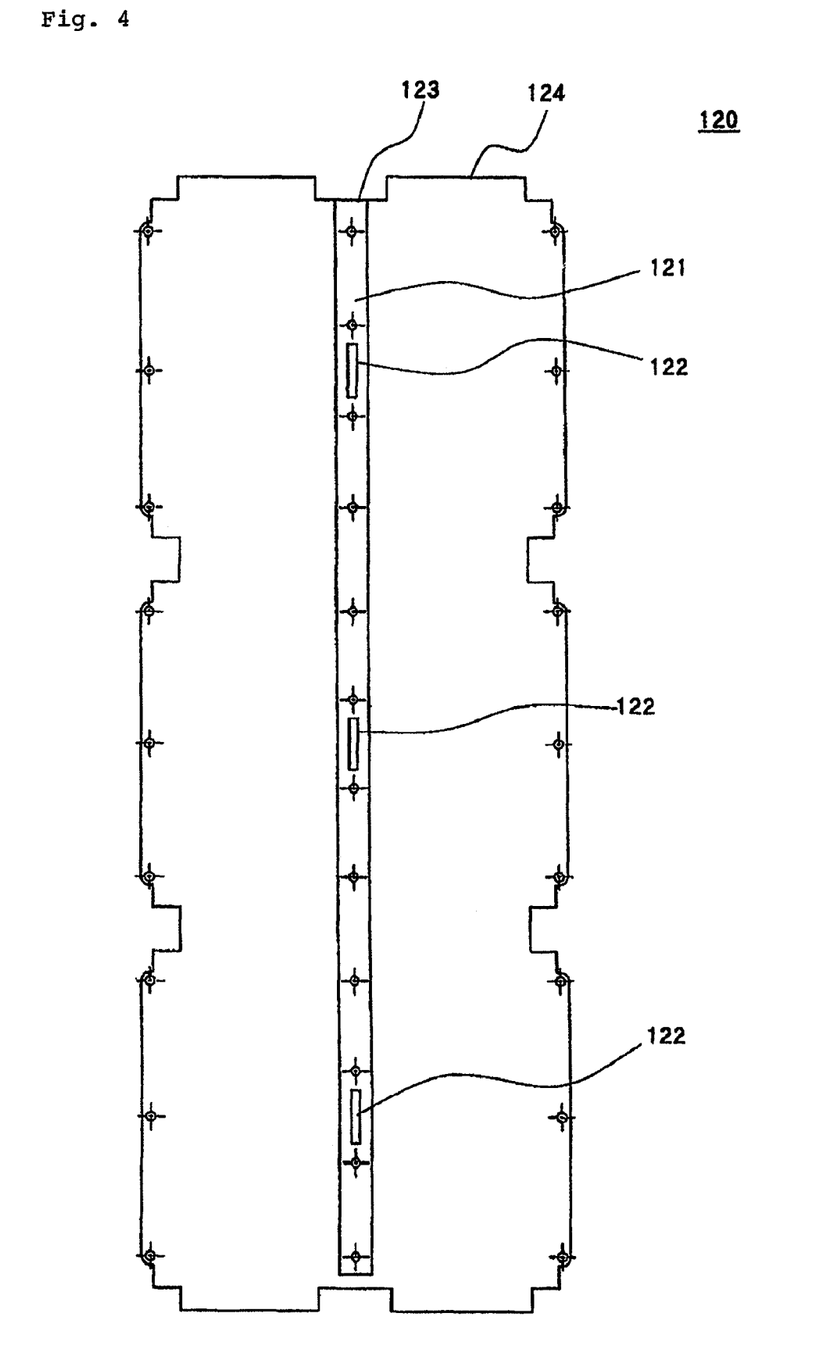
FIG. 4 is a top view illustrating another example of the first pressure plate of the present invention.

In addition, although first pressure plate 20 illustrated in FIG. 3 shows an example in which gas guide grooves 21 are formed independently in three through holes 22 and three exhaust ports 23 respectively, the present invention is not limited to this. For example, it is also desirable to adopt construction in which one gas guide groove 121 is formed in three penetrating portions 122 and exhaust ports 123 such as first pressure plate 120 illustrated in FIG. 4.

When a gas that is generated within a battery is discharged from gas discharger 8, this gas passes waste gas channel 10*i* of frame member 10, and flows into gas guide groove 21 through the hole 22 of first pressure plate 20. Then, the gas which flows into gas guide groove 21 is discharged from exhaust port 23 formed in sidewall face 24. A duct not illustrated may be connected to exhaust port 23 to perform discharging to the outside.

As mentioned above, gas guide groove 21 is formed in first pressure plate 20. Thus, since gas guide groove 21 is formed in first pressure plate 20, the degree of rigidity of pressure plate 20, where the groove is formed, is different from rigidity where there no groove is formed. When battery element 2 is directly held down by such a plate whose rigidity is not uniform the distribution of pressure that is generated is applied to principal surface 2*a* of battery element 2. Such pressure distribution becomes one of the factors which shorten battery life. Nevertheless, first pressure plate 20 of this exemplary embodiment does not hold down battery element 2 directly, but holds down frame portion 10*a* of frame member 10 that is thicker than thickness of battery element 2. For this reason, a space is also formed also between first pressure plate 20 and battery element 2. In short, the present invention prevents a battery lifetime from being shortened by first pressure plates 20 whose rigidity is not uniform and which is caused by forming gas guide groove 21, because atmospheric pressure which is uniform pressure is applied to principal surface 2*a* of battery element 2. Since second pressure plate 30 does not hold down battery element 2 directly, there is no problem even if gas guide grooves 21 are formed in a second pressure plate 30 side.

In this way,

Since gas guide groove 21 can be formed in first pressure plate 20 itself on this way, the construction that is shown in this exemplary embodiment is further advantageous with respect to the following points.

First, since the construction shown in this exemplary embodiment, it is not necessary to provide a separate duct for guiding gas, it is also possible to reduce the number of parts.

In addition, since gas guide groove 21 for guiding gas from through hole 22 to exhaust port 23 of sidewall face 24 is groove-shaped, for example, in comparison with the shape of a duct which extends to the outside and which protrudes, it is possible to lower the overall height of the system. For this reason, it is possible to miniaturize the whole system.

Figure 5:
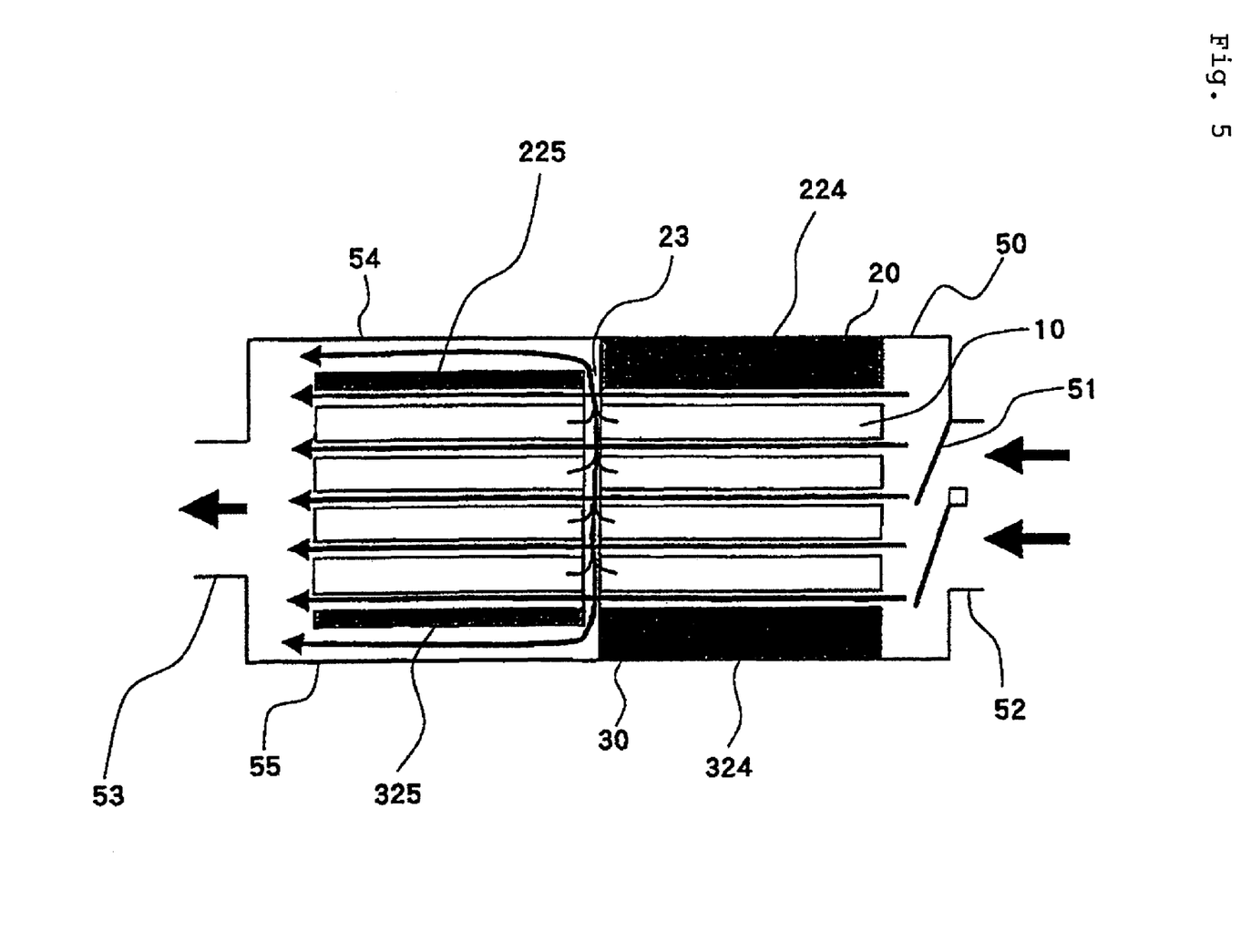
FIG. 5 is a schematic sectional side view of the assembled batteries of the present invention which is packaged in a case.

Next, FIG. 5 illustrates a schematic sectional side view of the assembled batteries of this exemplary embodiment which is packaged in a case.

A state where four stages of frame members 10 packaging film-covered battery 1 are stacked is illustrated in FIG. 5. Then, these four-stages-stacked frame members 10 are packaged in case 50 in a state in which they are sandwiched by first pressure plate 20 and second pressure plate 30. In this drawing, first pressure plate 20 and second pressure plate 30 have first fixing portions 224 and 324 and second fixing portions 225 and 325 whose thickness is thinner than that of these first fixing portions 224 and 324. First pressure plate 20 closely comes into contact with upper wall 54 of case 50, and second pressure plate 30 closely makes contact with lower wall 55 of case 50. On the other hand, second fixing portion 225 forms a space between second fixing portion 225 and upper walls 54, and second fixing portion 325 forms a space between second fixing portion 325 and lower walls 55. These spaces become a flow path for cooling air or for gas that is discharged.

Next, a flow of cooling air in case 50 will be described.

The cooling air supplied from inlet 52 side opens check valve 51, and flows into case 50. The cooling air which flows into case 50 flows into a gap between case 50 and frame member 10 to flow toward exhaust port 53. In this case, the cooling air that flows draws away the heat that has which been generated by battery element 2 of film-covered battery 1. In a portion beyond first fixing portions 224 and 324, the cooling air goes to exhaust port 53 with flowing between upper wall 54 of case 50 and second fixing portions 225 and 325. The cooling air which cooled the battery is finally discharged to the outside from exhaust port 53.

In case 50 of this exemplary embodiment, since the inlet 52 and the exhaust port 53 are provided at positions such that the inlet 52 faces the exhaust port 53, the flow of cooling air in case 50 from check valve 51 to exhaust port 53 becomes smooth. In addition, since a construction is adopted in which cooling air hardly flows backwards from a side of exhaust port 53 to a side of check valve 51 side because check valve 51 is provided and because first fixing portions 224 and 324 are in close contact with the wall surface of the case, cooling air can be smoothly flow toward exhaust port 53.

The invention claimed is:

1. A film-covered electrical device packaging system for fixedly holding a film-covered electrical device having an electrical device element, a case film which is arranged to surround said electrical device element, and a gas discharger provided in said case film, comprising:

a frame member which has a frame portion thicker than a thickness of said electrical device element, said frame portion holds an outer periphery portion of each film-covered electrical device in said frame portion, and in which a waste gas channel is formed in a position corresponding to said gas discharger; and a pressure plate which holds down said frame member in a direction of the thickness of said frame member, in which a through hole is formed in a position corresponding to said waste gas channel, and in which a gas guide groove connecting from said through hole to a sidewall face is formed, wherein said frame member has a space between said electrical device element and said pressure plate by a difference of said thicknesses between said frame portion and said electrical device element, and wherein said frame member holds at least two film-covered electrical devices which are provided relative to each other in a direction which is perpendicular to the thickness direction.

2. The film-covered electrical device packaging system according to claim 1, comprising a plurality of independent gas guide grooves.

3. The film-covered electrical device packaging system according to claim 1, comprising said one gas guide groove having a plurality of said through holes.

4. The film-covered electrical device packaging system according to claim 1, comprising said frame member that packages said film-covered electrical device, and a case that packages said pressure plate which holds down said frame member.

5. The film-covered electrical device packaging system according to claim 4,
   wherein said pressure plate has a first fixing portion and a second fixing portion whose thickness is thinner than that of said first fixing portion,
   wherein said pressure plate is fixed in said case by said first fixing portion abutting on a wall surface in said case, and
   wherein a space is formed between said second fixing portion and said case.

6. The film-covered electrical device packaging system according to claim 4,
   wherein said case has an opening portion which introduces cooling air, a check valve provided in said opening portion, and an exhaust port which discharges said cooling air, and
   wherein said opening portion and said exhaust port are formed at positions such that the opening portion faces the exhaust port.

\* \* \* \* \*